3,314,966
SUBSTITUTED BENZO[a]QUINOLIZINES
Arnold Brossi, Verona, N.J., and Hans Bruderer, Riehen, and Otto Schnider, Basel, Switzerland, assignors to Hoffmann-La Roche Inc., Nutley, N.J., a corporation of New Jersey
No Drawing. Filed Apr. 6, 1964, Ser. No. 357,796
Claims priority, application Switzerland, Aug. 31, 1962, 10,375/62
12 Claims. (Cl. 260—289)

This is a continuation-in-part of application S.N. 303,433, filed Aug. 20, 1963, now abandoned.

The present invention relates to a novel class of chemical compounds, intermediates useful in the preparation thereof, and processes for preparing the same.

More specifically, the present invention relates to compounds having the formula of

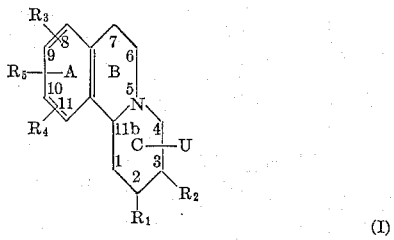

(I)

wherein the character U connotes the presence of a monoethylenic linkage on the ring C; $R_1$ is selected from the group consisting of lower alkyl, lower alkenyl, ar-lower alkyl, aryl, lower alkoxyaryl, lower alkaryl, nitroaryl, and haloaryl; $R_2$ is selected from the group consisting of hydrogen, lower alkyl, lower alkenyl, ar-lower alkyl, aryl, lower alkoxyaryl, lower alkaryl, nitroaryl, and haloaryl; $R_3$, $R_4$, and $R_5$ are selected from the group consisting of, individually, hydrogen, hydroxy, acyloxy, lower alkyl, lower alkoxy, and, taken together, lower alkylenedioxy; and their pharmaceutically acceptable salts.

The term "alkyl," as used above, comprehends both straight and branched chain saturated hydrocarbon groups, for example, lower alkyl groups such as methyl, ethyl, N-propyl, isopropyl, butyl, isobutyl, 2-ethylbutyl, hexyl, and the like. Similarly, the terms "alkoxy" and "lower alkylenedioxy" comprehend groups such as methoxy, ethoxy, butoxy and the like, or methylenedioxy, ethylenedioxy and the like, respectively. Also, the term "lower alkenyl" comprehends groups such as allyl, methallyl, β,β-dimethylallyl, propenyl and the like. The term "aryl" and the expression "ar-lower alkyl" represent, respectively, a group such as phenyl or a group such as benzyl, phenethyl and their allyl-, nitro- or halogen substituted derivatives and the like. Acyloxy preferably represents lower alkanoyl residues such as acetoxy and the like. The expression "alkoxyaryl" connotes a group such as phenyl having an alkoxy radical of the type enumerated above substituted thereon, e.g. 4-methoxyphenyl. The term "lower alkaryl" comprehends a substituted phenyl group such as p-tolyl and the like. "Haloaryl" represents, for example, a halogen-substituted phenyl group, for example, a p-chlorophenyl group or a 3,4-dichlorophenyl group. The term "halogen" is intended to encompass all the four forms thereof, i.e. chlorine, bromine, fluorine, and iodine. The term "nitroaryl" refers to a group such as, for example, 4-nitrophenyl.

In a preferred aspect in compounds of Formula I above $R_3$ is joined to the ring nucleus in the 9-position and $R_4$ is joined to the ring nucleus in the 10-position. Compounds wherein $R_3$ and $R_4$ are lower alkoxy, suitably methoxy, are particularly efficacious for the purposes of the present invention.

The ring C of compounds of Formula I above, due to the presence of the monoethylenic linkage (which is designated by the character U) have the following configuration:

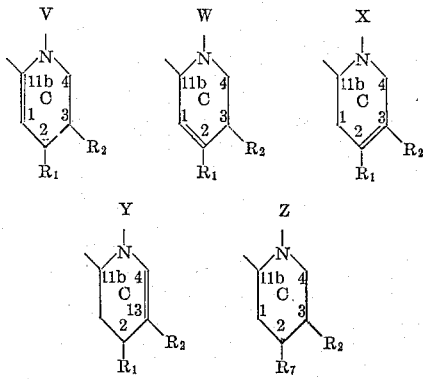

wherein $R_7$ is selected from the group consisting of ar-lower alkylidene and $R_1$ and $R_2$ are as above.

Compounds of Formula I wherein the character U signifies a monoethylenic linkage located between carbon atoms 1 and 2 (Formula W), carbon atoms 2 and 3 (Formula X), or extending exocyclically from carbon atom 2 (Formula Z) are preferred. Especially preferred are those compounds wherein the monoethylenic linkage is positioned on the ring C between carbon atoms 2 and 3.

In one of the broad process aspects of the present invention, the compounds corresponding to Formula I above can be readily synthesized by a process which comprises reacting a 2-hydroxy-benzo[a]quinolizine compound of the formula of

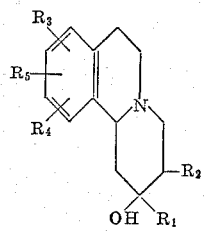

(II)

wherein $R_1$, $R_2$, $R_3$, $R_4$, and $R_5$ have the same significance as ascribed thereto hereinabove, or a pharmaceutically acceptable salt thereof, with a dehydrolyzing agent.

In one aspect, the dehydrolyzing agent functions as the medium in which the dehydrolysis is effected. In an alternate embodiment, the dehydrolysis can be effected in any convenient inert organic solvent such as dimethylformamide and tetrahydrofuran.

As is evident from the Formula II above, when $R_2$ is other than hydrogen, the 2-hydroxy-benzo[a]quinolizines of Formula II possess three asymmetrical centers. Thus, there are possible 8 optical antipodes or 4 racemates of the structure of Formula II. Furthermore, when $R_2$ is H, the compounds of Formula II possess two asymmetrical centers. Thus, there are possible 4 optical antipodes or 2 racemates of the structure of Formula II. It has been ascertained that the compounds of Formula II, when prepared employing a metal-organic acetylene compound, belong to a stereoisomeric series designated as the α-series and that compounds of Formula II above, prepared employing a Grignard reagent, belong to a different stereoisomeric series designated as the β-series.

The starting compounds having the Formula II of the α-stereoisomeric series can be obtained by the condensation of 2-oxo-hexahydro-benzo[a]quinolizine (substituted by substituents $R_2$, $R_3$, and $R_4$) with a metal-organic acetylene compound having the formula $$MC \equiv CR_6$$

wherein $R_6$ signifies, for example, hydrogen or lower alkyl such as methyl, ethyl, isobutyl and the like; or aryl such as a monocyclic hydrocarbon aryl, e.g. phenyl, tolyl, halophenyl and the like.

e.g. with a lithium acetylide which may be alkyl-subtituted) and by subsequent hydrolysis of the condensation product to form a 2-hydroxy compound and hydrogenation of the acetylene residue situated in the 2-position. These products, if desired, can be converted into a pharmaceutically acceptable salt thereof. For example, they can be converted into an acid addition salt by treating the same with any suitable inorganic acid such as hydrochloric acid, hydrobromic acid and the like.

Compounds of Formula II of the said different stereoisomeric series, namely, the β-series, can be obtained by reacting the said 2-oxo-benzo[a]quinolizine which has the formula

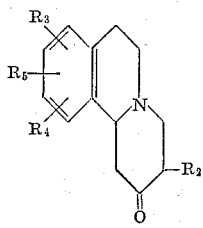

(III)

wherein $R_2$, $R_3$, $R_4$, and $R_5$ have the same meaning as ascribed thereto hereinabove (obtained according to the procedure set out in British Patent Nos. 789,789 and 845,098)

with a Grignard compound of the formula $$R_1—Mg—halogen \quad (IV)$$

wherein $R_1$ has the same meaning as ascribed thereto hereinabove, hydrolyzing the condensation product and, if desired, converting the resulting tertiary carbinol into a salt. Furthermore, the tertiary carbinol so obtained can be esterified or etherified and, if desired, converted into a salt employing suitable organic and inorganic acids of the type enumerated hereinafter in connection with the formation of the pharmaceutically acceptable salts of compounds having the Formula I above.

The condensation is carried out, for example, by adding the ketone of Formula III above either in solid, finely powdered form or in an indifferent solvent (such as, for example, absolute ether, benzene, tetrahydrofuran, dioxan) to the Grignard compound of Formula IV which is present in a similar organic indifferent solvent. One can also proceed by adding the solution of the Grignard compound of Formula IV to a solution of the ketone of Formula III. After the reaction is complete, the reaction product is subjected to the hydrolysis. The hydrolysis proceeds with particular advantage under substantially neutral conditions; for example, by addition of water or aqueous ammonium chloride solution. The basic end products of Formula II, which are dissolved in the organic phase, can be isolated via conventional means; for example, by evaporation of the solvent or extraction with a mineral acid and subsequent liberation of the base by decomposition with dilute alkali.

Compounds corresponding to Formula II above, whether of the α- or β-stereoisomeric series or otherwise, having an alkoxyaryl, nitroaryl or a haloaryl group in the 3-position are novel. Thus, compounds of both the α- and the β-stereoisomeric series having the general formula of

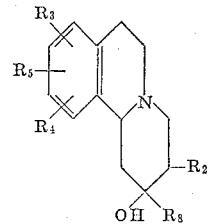

(V)

wherein $R_2$, $R_3$, $R_4$, and $R_5$ have the same meaning as ascribed thereto hereinabove and $R_8$ is selected from the group consisting of alkoxyaryl, nitroaryl, and haloaryl are novel and constitute a part of the present invention.

The tertiary carbinols of Formula V above, obtained after the hydrolysis can, if desired, be esterified or etherified in a further reaction step. Acylation agents which are applicable for the manufacture of esters are, for example, aliphatic (preferably lower alkyl) or aromatic carboxylic acid chlorides or anhydrides (such as acetyl chloride, benzoyl chloride, acetic anhydride etc.). Alkyl ethers can be manufactured by alcoholysis; for example, by treatment of an ester (e.g. an acetoxy compound) with an alcohol (preferably a lower alkanol, e.g. methanol, ethanol).

Dehydrolyzing agents suitable for use in the preparation of compounds of Formula I above according to the said one broad process aspect of the present invention may be represented by inorganic acids such as hydrochloric acid, hydrobromic acid, sulfuric acid, phosphoric acid and the like, or organic acids such as chloroethanesulfonic acid, toluenesulfonic acid, oxalic acid and other reagents such as phosphorus oxychloride, phosphorus pentachloride, phophorus pentoxide, thionyl chloride, zinc chloride, potassium bisulfate and the like. An inorganic mineral acid such as sulfuric acid is preferred.

In one embodiment, the compound corresponding to Formula II above is added to the dehydrolyzing agent, suitably, a mineral acid such as sulfuric acid, and the resultant reaction mixture is maintained under reflux conditions at the boiling temperature thereof. The mixture can be maintained under such conditions for a period of one to several hours. However, a duration of about 3½ hours has been conveniently employed. Thereafter, the desired product can be isolated and purified from the resultant mixture which may contain various isomers differing only in the position of the monoethylenic linkage, employing conventional techniques, for example, by first neutralizing and thereafter purifying the basic end products utilizing any convenient means, such as a distillation procedure, a recrystallization procedure or a chromatographic procedure.

The monoethylenic linkage in ring C of the compound of Formula I above resulting from dehydrolyzing the compound of Formula II above can be located on the ring C in several different positions, the character of the substituents $R_1$ and $R_2$ ond the dehydration conditions and/or dehydrolyzing agents being determinative of such position. The monoethylenic linkage is preferably located in the bistertiary position between the carbon atoms 2 and 3. However, the ring C can contain the said ethylenic linkage positioned between carbon atoms 1 and 2, carbon atoms 3 and 4 and carbon atoms 11b and 1. Generally, the products resulting from the reaction of compounds of Formula II above with a dehydrolyzing agent consists of mixtures of isomers differing only in the position of the ethylenic linkage. As pointed out above, these isomers can be separated employing conventional techniques. Those compounds of Formula I above wherein $R_1$ represents ar-lower alkyl group or a substituted derivative thereof can have the monoethylenic linkage thereof displaced semicyclically emanating from the 2-carbon atom.

In a preferred embodiment, compounds of Formula II above wherein $R_1$ and $R_2$ are both alkyl are dehydrolyzed employing a mineral acid such as sulfuric acid. In proceeding accordingly, there is obtained a compound which contains a bis-tertiary ethylenic linkage in the ring C, namely, 1,4,6,7-tetrahydro-11bH-benzo[a]quinolizine.

In an analogous manner, when the dehydrolysis of a compound of Formula II above is carried out wherein $R_1$ is aryl (e.g. phenyl or a substituted phenyl) and $R_2$ is alkyl, there is obtained not only 1,4,6,7-tetrahydro compounds, but also 3,4,6,7-tetrahydro compounds. The same is the case with compounds of the Formula I wherein $R_2$ represents hydrogen. Furthermore, if a compound of Formula II above wherein $R_2$ is ar-lower alkyl or a substituted derivative thereof is dehydrolyzed employing thionyl chloride, there is obtained a compound of Formula I above wherein the ethylenic linkage extends exocyclically from carbon atom 2.

In another of the broad process aspects of the present invention, the compounds corresponding to Formula I above can be prepared by a process which comprises oxidizing, in the presence of an acid agent, a compound of Formula II above, i.e. a compound of the formula

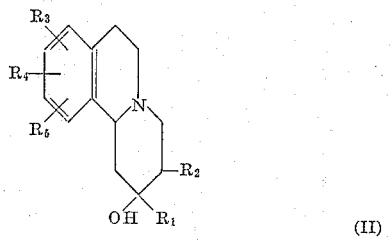

(II)

wherein $R_1$, $R_2$, $R_3$, $R_4$ and $R_5$ have the same significance as ascribed thereto hereinabove with an oxidizing agent whereby to form a quaternary compound of the formula

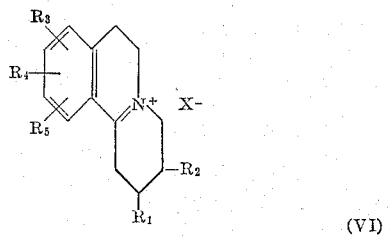

(VI)

wherein $R_1$, $R_2$, $R_3$, $R_4$ and $R_5$ have the same meaning as above and X is an anion, e.g. a halogen anion, an acetate anion and the like and reducing the so-formed compound of Formula VI above whereby to prepare compounds corresponding to Formula I above.

The oxidation of compounds of Formula II above to compounds of Formula VI above can be effected with any suitable oxidizing agent such as a mercuric, cupric or ferric salt, e.g. the acetate salt, in the presence of an acid agent, e.g. an inorganic or organic acid. Among the acid agents may be included mineral acids, e.g. hydrohalic acids such as HBR, HCl and sulfuric acid. Organic acids are represented by acetic acid. Advantageously, the oxidation is effected with mercuric acetate, preferably in an acetic acid solution.

The reduction of quaternary compounds of Formula VI above may be achieved by treatment with a borohydride or any suitable reducing system capable of effecting such reduction. The preferred reagents are, for example, alkali metal borohydrides such as lithium borohydride, potassium borohydride or, preferably, sodium borohydride in a solvent such as a lower alkanol, for example, methanol. Other borohydrides such as aluminum borohydride and alkaline earth metal borohydrides, e.g. calcium borohydride may be used as well.

The reduction procedure favors the preparation of compounds of Formula I above of configuration X, i.e. wherein the mono-ethylenic linkage is located between carbon atoms 2 and 3 of Formula I. The reduction, as is noted above, preferably proceeds in the presence of a lower alkanol which may be methanol, although other organic solvents such as ethers may be employed. The reduction is carried out at room temperature or at an elevated temperature.

The compounds of Formula I above are basic substances which can be substantially obtained in crystalline form. They form crystalline water soluble salts with common organic or inorganic acids. Thus they form pharmaceutically acceptable acid addition salts with pharmaceutically acceptable acids such as for example, sulfuric acid, phosphoric acid, the hydrohalic acids such as hydrochloric acid, hydrobromic acid, tartaric acid, maleic acid, citric acid, succinic acid and the like.

Compounds of Formula I above also form quarternary ammonium salts with conventional quaternizing agents such as lower alkyl and alkenyl halides, e.g. methyl iodide, allyl bromide and dilower alkyl sulfates such as dimethyl-sulfate.

Those compounds of Formula I above which contain a monoethylenic linkage between carbon atoms 2 and 3 in ring C have an asymmetrical carbon atom 11b and thus are obtained in accordance with the procedure set out above in the form of the racemate. If desired, this racemate can be separated into its optical antipodes. The splitting up of the racemate into its optical antipode can be carried out in a conventional manner, for example, by fractional crystallization of a salt of the racemic with optically active acids such as dibenzoyl-D-tartaric acid and D-camphorsulfonic acid. When compounds corresponding to Formula II above are of the optically active α- and β-series and such optically active compounds are dehydrolyzed whereby to prepare corresponding compounds of Formula I above, then the products resulting from such a preparative procedure are also optically active.

Compounds of Formula I above have valuable therapeutic properties. For example, they are useful as sedatives and antiemetic agents. They can be administered internally (with dosage adjusted according to individual requirements), for example, in the form of pharmaceutical preparations which contain them or their pharmaceutically acceptable acid addition salts in admixture with a pharmaceutical, organic or inorganic inert carrier material suitable for enteral or parenteral application such as, for example, water, gelatin, lactose, starch, magnesium stearate, talc, vegetable oils, gums, polyalkylene glycols, Vaseline, etc. The pharmaceutical preparations can be present in solid forms (for example, as tablets, dragées, suppositories, capsules) or in liquid form (for example, as solutions, suspensions, or emulsions). If desired, they can be sterilized and/or contain additive materials such as conservation, stabilization, wetting or emulsification agents, salts for varying the osmotic pressure, or buffers. They can also contain other therapeutically active substances.

The following examples are illustrative of the present invention but not limitative thereof. Various modifications will be apparent to those skilled in the art and are included within the scope of the invention. All temperatures are stated in degree centigrade.

*Example 1*

3 g. of β-2-hydroxy-2,3-diethyl-9,10-dimethoxy-1,2,3,4,6,7-hexahydro-11bH-benzo[a]quinolizine was added to 100 ml. of 11 N sulphuric acid. The resultant solution is boiled under reflux conditions for 3½ hours. The reaction mixture was cooled in an ice bath, made alkaline with caustic soda, taken up in benzene and passed through a column of aluminum oxide (activity II). The eluate was stripped of solvent and 2,3-diethyl-9,10-dimethoxy- ,4,6,7 - tetrahydro-11bH-benzo[a]quinolizine was obtained as the residue.

The hydrochloride of 2,3-diethyl-9,10-dimethoxy-1,4,6,7-tetrahydro-11bH-benzo[a]quinolizine was prepared by adding to a solution of the base in acetone, alcoholic hydrochloric acid. After resolution from alcohol/ether, the hydrochloride was found to have a melting point of 225–227°. U.V.-maxima in rectified alcohol at 231 m$\mu$ and 285 m$\mu$, $\epsilon$=11,700 and 5,600.

The starting material was prepared as follows:

In a round flask equipped with a stirrer, a reflux condenser and a dropping funnel, 12.1 g. of magnesium were covered over with abs. ether after the addition of a few granules of iodine, and thereafter with 10 g. of ethyl iodide. As soon as the reaction had set in, a solution of 61 g. of ethyl iodide in 500 ml. of abs. ether was slowly added dropwise while stirring so that a continous reaction took place. After the dissolution of the magnesium, the Grignard solution was added, while stirring, to a solution of 63.5 g. of 2-oxo-3-ethyl-9,10-dimethoxy-1,2,3,4,6,7 - hexahydro - 11bH - benzo[a]quinolizine of melting point 110–112° in 1.5 l. of abs. tetrahydrofuran. The resulting mixture was subsequently stirred overnight at room temperature. It was then concentrated in a water-jet vacuum, the residue treated with 2 l. of ether and shaken with water. The ethereal solution was subsequently extracted with 2 N hydrochloric acid, then the basic portions in the hydrochloric acid extract were liberated by the addition of caustic soda up to an alkaline reaction and extracted with benzene. The basic extract, which was obtained after concentration of the benzene solution, is dissolved in isopropyl ether and left to stand overnight. There was thus obtained $\beta$-2-hydroxy-2,3-diethyl - 9,10 - dimethoxy - 1,2,3,4,6,7 - hexahydro - 11bH-benzo[a]quinolizine which melted at 131–132° after resolution from benzene/(petroleum ether). The hydrochloride, which was prepared in acetone with alcoholic hydrochloric acid, melted at 215–216°.

*Example 2*

$\alpha$ - 2 - hydroxy - 2,3 - diethyl - 9,10 - dimethoxy - 1,2,3,4,6,7 - hexahydro - 11bH - benzo[a]quinolizine hydrochloride, melting point 192–194°, melting point of the base 123–125° (obtained from 2-oxo-3-ethyl-9,10-dimethoxy - 1,2,3,4,6,7-hexahydro - 11bH - benzo[a]quinolizine and lithium acetylide, with subsequent hydrolysis and hydrogenation) was treated with 11 N sulphuric acid in the manner set out in Example 1. The treatment yielded a tetrahydrobenzo[a]quinolizine which is identical with the product obtained in Example 1.

*Example 3*

10 g. of $\beta$-2-hydroxy-2-phenyl-3-methyl-9,10-dimethoxy-1,2,3,4,6,7-hexahydro-benzo[a]quinolizine was dissolved in 300 ml. of 11 N sulphuric acid and boiled under reflux conditions for 3½ hours. The reaction mixture was treated as described in Example 1 and the hydrochloride was prepared by dissolution of the base in acetone and addition of alcoholic hydrochloric acid. After resolution from alcohol/ether, there was obtained 2-phenyl-3-methyl - 9,10 - dimethoxy - 1,4,6,7 - tetrahydro - 11bH-benzo[a]quinolizine hydrochloride, melting point 232°. U.V.-maxima in rectified alcohol at 227 and 283 m$\mu$, $\epsilon$=14,670 and 3,730.

2 - phenyl - 3 - methyl - 9,10 - dimethoxy - 3,4,6,7-tetrahydro-11bH-benzo[a]quinolizine hydrochloride of melting point 226° was isolated from the mother liquor as follows:

The concentrated mother liquor was basified by adding aqueous sodium hydroxide solution, whereupon the benzo[a]quinolizine base was extracted with chloroform. The chloroform extract was concentrated and the residue taken up in a mixture of benzene and ether (9:1). The resulting solution was filtered through aluminum oxide and the filtrate was concentrated. The resulting 2 - phenyl - 3 - methyl - 9,10 - dimethoxy - 3,4,6,7-tetrahydro-11bH-benzo[a]quinolizine was converted into its hydrochloride of melting point 226°. U.V. maxima in rectified alcohol at 233 and 268 m$\mu$, $\epsilon$=18,300 and 3,420.

The $\beta$ - 2 - hydroxy - 2 - phenyl - 3 - methyl - 9,10-dimethoxy - 1,2,3,4,6,7 - hexahydro - benzo[a]quinolizine, melting point 57–58°, employed as the starting material, was prepared from 2-oxo-3-methyl-9,10-dimethoxy-1,2,3,4,6,7-hexahydro-11bH-benzo[a]quinolizine, melting point 138–140° and phenylmagnesium bromide in the manner set out in Example 1.

*Example 4*

10 g. of $\beta$-2-hydroxy-2-(p-chloro-phenyl)-3-ethyl-9,10 - dimethoxy - 1,2,3,4,6,7 - hexahydro - 11bH - benzo[a]quinolizine was dissolved in 300 ml. of 11 N sulphuric acid and boiled under reflux conditions for 3½ hours. The reaction mixture was cooled in an ice bath and treated as in Example 1, yielding 2-(p-chloro-phenyl)-3 - ethyl - 9,10 - dimethoxy - 3,4,6,7 - tetrahydro - 11bH-benzo[a]quinolizine, melting point 95° after resolution from isopropyl alcohol. U.V. maxima in rectified alcohol at 240 and 281 m$\mu$, $\epsilon$=20,400 and 5,500.

The $\beta$ - 2 - hydroxy - 2 - (p - chloro - phenyl) - 3-ethyl - 9,10 - dimethoxy - 1,2,3,4,6,7 - hexahydro - 11bH-benzo[a]quinolizine of melting point 152° employed as above was prepared from 2-oxo-3-ethyl-9,10-dimethoxy-1,2,3,4,6,7 - hexahydro - 11bH - benzo[a]quinolizine, melting point 110–112° and p-chlorophenyl-magnesium bromide in the manner set out in Example 1.

*Example 5*

In a round flask fitted with stirrer, reflux condenser and dropping funnel, 36.5 g. of magnesium metal were covered with 50 ml. of absolute ether. Upon addition of a small quantity (trace) of iodine, a solution of 287.2 g. of p-chloro-brombenzene in 500 ml. of absolute ether was added at such a rate (within 1 hour and a quarter) that the reaction mixture was kept under slight reflux. The non-reacted magnesium was then removed by filtration. The filtrate was added, while stirring, to a solution of 86.8 g. of (+)-2-oxo-3-ethyl-9,10-dimethoxy-1,2,3,4,6,7 - hexa - hydro - 11bH - benzo[a]quinolizine, ($[\alpha]_D^{26}$=+89° [c.=1 in ethanol], prepared from the corresponding racemic mixture) in 4.5 litres of tetrahydrofuran. During the addition, the temperature of the mixture rose to 45° C. Upon cooling to room temperature and stirring for one hour, the solvent was evaporated. The residue was treated with 500 ml. of a saturated aqueous solution of ammonium chloride, the resulting solution shaken three times with 1500 ml. of chloroform each. The combined chloroform extracts were washed with sodium chloride solution, dried over sodium sulfate and concentrated. The residue was dissolved in 2 litres of acetone and the resulting solution was treated with excess ethanolic hydrogen chloride while cooling and stirring. The yellow crystals separating on cooling with ice were filtered off and boiled in 2 litres of acetone.

Upon removal of the acetone by filtration there were obtained slightly yellow crystals of (+)-2-hydroxy-2-(p-chloro - phenyl)-3-ethyl-9,10-dimethoxy-1,2,3,4,6,7-hexahydro-11bH-benzo[a]quinolizine hydrochloride; melting point 268–270° C. $[\alpha]_D^{25}$=+56° (c.=1.0 in methanol).

5 g. of (+)-2-hydroxy-2-(p-chloro-phenyl)-3-ethyl-9,10 - dimethoxy - 1,2,3,4,6,7-hexahydro-11bH-benzo[a] quinolizine obtained, from the above hydrochloride, was dissolved in 100 ml. of 11 N sulphuric acid and boiled under reflux conditions for 2 hours. The reaction mixture was cooled in an ice bath and treated as in Example 1, yielding (+)-2-(p-chloro-phenyl)-3-ethyl-9,10,dimethoxy-3,4,6,7-tetrahydro-11bH-benzo[a]quinolizine, melting at 96° after recrystallization from petroleum ether. U.V. maxima in rectified alcohol at 240 and 281 m$\mu$, $\epsilon$=20,400 and 5,500. $[\alpha]_D^{25}$=+113° (c.=1.0 in methanol).

Example 6

In the manner set out in Example 1, 2-ethyl-3-isobutyl-9,10 - dimethoxy-1,4,6,7-tetrahydro-11bH-benzo[a]quinolizine was obtained from α-2-hydroxy-2-ethyl-3-isobutyl-9,10 - dimethoxy - 1,2,3,4,6,7-hexahydro-11bH-benzo[a]quinolizine, melting point 121–122°. The crude product was purified by passing it through an aluminum oxide column (activity II). The base was converted into the hydrochloride and recrystallized from alcohol/ether, yielding the purified hydrochloride, melting point 222–224°.

Example 7

From β - 2 - hydroxy-2-methyl-3-ethyl-9,10-dimethoxy-1,2,3,4,6,7-tetrahydro-11bH-benzo[a]quinolizine, melting point of the hydrochloride 225–226° (prepared from 2-oxo - 3-ethyl-1,2,3,4,6,7-hexahydro-11bH-benzo[a]quinolizine and methyl magnesium iodide with subsequent hydrolysis of the reaction product), there is obtained, in the manner described in Example 1, 2-methyl-3-ethyl-9,10-dimethoxy - 1,4,6,7-tetrahydro-11bH-benzo[a]quinolizine hydrochloride, melting point 244–245°.

Example 8

In a round flask equipped with a stirrer, a reflux condenser and a dropping funnel, 41.5 g. of magnesium were covered over with 200 ml. of absolute ether after the addition of a few granules of iodine. A solution of 327 g. of p-chlorobromo-benzene in 1,200 ml. of ether was then added at such a rate (within 1 hour) that the reaction mixture was kept under reflux. The mixture was kept under reflux conditions for another hour and then filtered. The filtrate was added to a solution of 114.5 g. of 2 - oxo - 9,10-dimethoxy-1,2,3,4,6,7-hexahydro-11bH-benzo[a]quinolizine (M.P. 152°) in 2.5 l. of absolute tetrahydrofuran, whereupon the mixture was stirred at room temperature for 1 hour. The residue obtained upon removal of the solvent under reduced presure, was treated with 3 l. of a saturated aqueous solution of ammonium chloride. The resulting solution was extracted twice with 3 l. of ether. The combined ether extracts were dried over sodium sulfate and concentrated. The residue was dissolved in 1 l. of isopropyl ether. Pale yellow crystals separated on cooling and were removed by filtration. On recrystallization from a mixture of ethyl acetate and petroleum ether, there was obtained 2-hydroxy-2-(p-chlorophenyl) - 9,10-dimethoxy - 1,2,3,4,6,7-hexahydro-11bH-benzo[a]quinolizine (isomer I), melting at 168°.

The melting point of the hydrochloride was 222–224°, of the methiodide was 286–287° and of the nitrate was 220–222°.

Example 9

The mother liquors remaining after the separation of isomer I, as in Example 8, were concentrated to dryness. The residue was dissolved in one liter of ethyl acetate. To the resulting solution there was added an excess of ethanolic hydrogen chloride. The mixture was permitted to stand overnight. There was obtained, after several fractional recrystallizations from methanol-ether, a hydrochloride having a melting point of 210–212°. 10 g. of this hydrochloride were dissolved in water and, after being made alkaline, the solution was extracted with chloroform. The chloroform extract was dried and evaporated. The oily residue was crystallized from ether to give 2-hydroxy-2-(p-chlorophenyl)-9,10-dimethoxy-1,2,3,4,6,7-hexahydro-11bH-benzo[a]quinolizine (isomer II), melting point 95°. The hydrochloride thereof has a melting point of 210°–212°, the nitrate 160–162° and the methiodide 215–217° (all from methanol-ether).

Example 10

5 g. of finely powdered isomer I, of Example 8, was added to 5 ml. of concentrated sulfuric acid. After thorough stirring, there was obtained a clear reddish-brown solution. After cooling, this solution was poured into ice-water and the colorless precipitate which formed was filtered off and taken up in ether. The ether solution was dried over anhydrous sodium sulfate and concentrated. Colorless crystals were obtained, which, upon separation by thin layer chromatography, were found to comprise 2-(p-chlorophenyl)-9,10-dimethoxy-1,4,6,7- tetrahydro - 11bH - benzo[a]quinolizine and 2 - (p-chlorophenyl) - 9,10 - dimethoxy-3,4,6,7-tetrahydro-11bH-benzo[a]quinolizine. Upon concentration of the mother liquor, there was obtained a crystalline substance containing the same two compounds, namely, 2-(p-chlorophenyl)-9,10-dimethoxy - 1,4,6,7-tetrahydro-11bH-benzo[a]quinolizine and 2-(p-chlorophenyl)-9,10-dimethoxy - 3,4,6,7 - tetrahydro-11bH-benzo[a]quinolizine. 3.6 g. of this mixture were chromatographed on 30 times this amount of alumina, Activity II. The first benzene eluates (4 liter) gave a uniform fraction which, upon recrystallization from methanol, gave colorless crystals of 2-(p-chlorophenyl)-9,10-dimethoxy-1,4,6,7-tetrahydro - 11bH - benzo[a]quinolizine, melting at 150–152°.

2-(p-chlorophenyl) - 9,10 - dimethoxy - 3,4,6,7,-tetrahydro-11bH-benzo[a]quinolizine, M.P. 123–124°, was obtained by elution with 1 liter of ether and crystallization and recrystallization from methanol.

Example 11

The isomer II of Example 9, 2-hydroxy-2-(p-chlorophenyl)-9,10-dimethoxy - 1,2,3,4,6,7 - hexahydro - 11bH-benzo[a]quinolizine, was treated with sulfuric acid as in Example 10. There was thus obtained a mixture of 2-(p-chlorophenyl)-9,10 - dimethoxy - 1,4,6,7 - tetrahydro-11bH-benzo[a]quinolizine and 2-(p-chlorophenyl)-9,10-dimethoxy-3,4,6,7-tetrahydro-11bH - benzo[a]quinolizine which can be isolated one from the other by the technique exemplified in Example 10.

Example 12

50 g. of 2-hydroxy-2-(p-chlorophenyl)-9,10-dimethoxy-1,2,3,4,6,7-hexahydro-11bH-benzo[a]quinolizine (isomer I of Example 8) was dissolved in 2 l. of 10 percent acetic acid. After the addition of 213 g. of mercuric acetate, the solution was heated for 4 hours on an oil bath at 80°. A precipitate which formed was separated from the solution and then the solution was saturated with hydrogen sulfide. To this mixture, 5 g. of active carbon was added. The resultant mixture was filtered and the filtrate evaporated to dryness. The residue was dissolved in 100 ml. of warm acetone and left to crystallize at room temperature overnight. 2-(p-chlorophenyl)-6,7-dihydro-9,10-dimethoxy-benzo[a]quinolizinium acetate formed as yellow crystals. After recrystallization from acetone it melted at 140°.

2-(p-chlorophenyl) - 6,7 - dihydro - 9,10 - dimethoxy-benzo[a]quinolizinium bromide was prepared in the manner set out above except that 48 percent hydrobromic acid was substituted for the acetic acid. The bromide, after recrystallization from methanol-ether, was found to have a melting point of 274–275°. The corresponding chloride had a melting point of 232°.

Example 13

200 mg. of the quaternary salt 2-(p-chlorophenyl)-6,7-dihydro-9,10-dimethoxy - benzo[a]quinolizinium acetate was dissolved in 20 ml. of methanol and an excess of sodium borohydride was added. After one hour, the solvent was evaporated, water was added to the residue and extracted with chloroform. The extract was dried and evaporated leaving a colorless oil which, on an alumina thin layer plate (system: ethyl acetate; length 10 cm., reagent: platinic iodide) was found to be 2-(p-chlorophenyl)-9,10-dimethoxy - 1,4,6,7-tetrahydro - 11bH-benzo[a]quinolizine. After crystallization from isopropyl ether, it was found to have a melting point of 150°.

2-(p-chlorophenyl-6,7-dihydro - 9,10 - dimethoxy-benzo[a]quinolizinium chloride or bromide can be converted to 2-(p-chlorophenyl) - 9,10 - dimethoxy - 1,4,6,7 - tetrahydro-11bH-benzo[a]quinolizine by a similar technique.

*Example 14*

From (+)-β-2-hydroxy-2-methyl - 3 - ethyl - 9,10-dimethoxy-1,2,3,4,6,7-hexahydro - 11bH - benzo[a]quinolizine hydrochloride, melting point 165° (dec.) after resolution from ethanol/acetone, $[\alpha]_D^{25} = +49°$ (c.=1 in methanol), melting point of the base 126–127° after resolution from isopropyl ether (prepared from (+)-2-oxo-3-ethyl-9,10-dimethoxy-1,2,3,4,6,7-hexahydro - 11bH - benzo[a]quinolizine, melting point 123° $[\alpha]_D^{26} = +95°$ (c.=1 in ethanol) and methylmagnesium iodide with subsequent hydrolysis of the reaction product) there is obtained, by hydrolysis, according to the procedure described in Example 1, (+)-2-methyl-3-ethyl-9,10-dimethoxy-1,4,6,7-tetrahydro-11bH-benzo[a]quinolizine. Melting point of the hydrochloride: 241–242°, $[\alpha]_D^{24} = +242°$ (c.=0.5 in methanol).

*Example 15*

In a round flask equipped with a stirrer, a reflux condenser and a dropping funnel, 12.1 g. of magnesium were covered over with 100 ml. of absolute ether, whereupon 93.5 g. of p-bromoanisole are added dropwise. Upon completion of the reaction and filtration, the filtrate was added to a solution of 55 g. of 2-oxo-3-methyl-9,10-dimethoxy-1,2,3,4,6,7-hexahydro - 11bH - benzo[a]quinolizine of melting point 110–112° in 1.5 l. of tetrahydrofuran. The resulting mixture was subsequently stirred for one hour at room temperature. It was then concentrated under reduced pressure, and the residue was treated with 2 l. of ether and shaken with water. The ethereal solution was subsequently extracted with 2 N hydrochloric acid, then the basic portions in the hydrochloric acid extract were liberated by the addition of sodium hydroxide up to an alkaline reaction, and extracted with benzene. The benzene extract was concentrated and the residue was dissolved in isopropyl ether and left to stand overnight. There was thus obtained β-2-hydroxy-2-(p-methoxy-phenyl) - 3 - methyl - 1,2,3,4,5,6,7 - hexahydro-11bH-benzo[a]quinolizine. The corresponding hydrochloride melted at 230°.

*Example 16*

Isomers A and B of 2-hydroxy-(p-chlorophenyl)-1,2,3,4,6,7-hexahydro - 11bH - benzo[a]quinolizine were prepared in an analogous manner to that set out in Examples 8 and 9 by treating 2-oxo-1,2,3,4,6,7-hexahydro-11bH-benzo[a]quinolizine with a Grignard reagent prepared from magnesium and p-chloro-bromobenzene in anhydrous ether.

Isomer A on recrystallization from ethyl acetate formed colorless crystals having a melting point of 179°.

The hydrochloride of isomer A formed colorless crystals on recrystallization from methanol-ether which were found to have a melting point of 248°.

Isomer B upon recrystallization from isopropyl ether formed light beige crystals having a melting point of 137–138°.

The hydrochloride of isomer B upon recrystallization from ethanol-ether was found to have a melting point of 219–220°.

*Example 17*

Treatment of isomer A or B with concentrated sulfuric acid, as in Example 10, yielded 2-(p-chlorophenyl)-1,4,6,7-tetrahydro-11bH-benzo[a]quinolizine as light beige crystals having a melting point of 129°.

The hydrochloride of 2-(p-chlorophenyl)-1,4,6,7-tetrahydro-11bH-benzo[a]quinolizine similarly formed light beige crystals on recrystallization from methanol-ether, melting point 259–261°.

We claim:

1. A compound selected from the group consisting of compounds of the formula

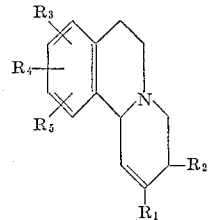

wherein $R_1$ is selected from the group consisting of lower alkyl, lower alkenyl, phenyl-lower alkyl, phenyl, lower alkoxy phenyl, lower alkyl phenyl and halophenyl; $R_2$ is selected from the group consisting of hydrogen, lower alkyl, lower alkenyl, phenyl-lower alkyl, phenyl, lower alkoxyphenyl, lower alkyl phenyl and halo-phenyl and $R_3$, $R_4$ and $R_5$ are selected from the group consisting of individually, hydrogen, lower alkyl, lower alkoxy and when two adjacent substituents are taken together, lower alkylenedioxy and their pharmaceutically acceptable salts.

2. A compound selected from the group consisting of compounds having the formula

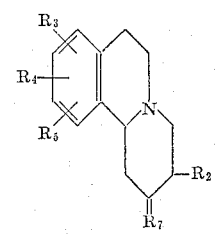

wherein $R_7$ is selected from the group consisting of phenyl-lower alkylidene; $R_2$ is selected from the group consisting of hydrogen, lower alkyl, lower alkenyl, phenyl-lower alkyl, phenyl, lower alkoxyphenyl, lower alkyl phenyl and halophenyl and $R_3$, $R_4$ and $R_5$ are selected from the group consisting of individually hydrogen, lower alkyl, lower alkoxy and, when two adjacent substituents are taken together, lower alkylenedioxy and their pharmaceutically acceptable salts.

3. 2,3-diethyl - 9,10 - dimethoxy - 1,4,6,7 - tetrahydro-11bH-benzo[a]quinolizine.

4. 2-(p-chlorophenyl)-3-ethyl - 9,10 - dimethoxy-3,4,6,7-tetrahydro-11bH-benzo[a]quinolizine.

5. A process which comprises reacting a compound having the formula of

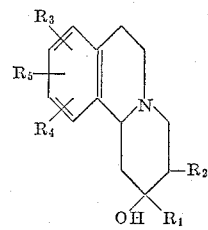

wherein $R_1$ is selected from the group consisting of lower alkyl, lower alkenyl, phenyl-lower alkyl, phenyl, lower alkoxy phenyl, lower alkyl phenyl and halophenyl; $R_2$ is selected from the group consisting of hydrogen, lower alkyl, lower alkenyl, phenyl-lower alkyl, phenyl, lower alkoxy phenyl, lower alkyl phenyl and halophenyl; $R_3$, $R_4$, and $R_5$ are selected from the group consisting of, individually, hydrogen, lower alkyl, lower alkoxy and, when two adjacent substituents are taken together, lower alkylenedioxy;

with a dehydrolyzing agent selected from the group consisting of hydrochloric acid, hydrobromic acid, sulfuric acid, phosphoric acid, chloroethanesulfonic acid, toluene sulfonic acid, oxalic acid, phosphorus oxychloride, phosphorus pentachloride, thionyl chloride, zinc chloride and potassium bisulfate.

6. A process as defined in claim 5 wherein a mineral acid is employed as the dehydrolyzing agent.

7. A process as defined in claim 6 wherein the mineral acid employed is sulfuric acid.

8. 2-$R_9$-3-$R_{10}$-9,10 - dimethoxy-1,4,6,7-tetrahydro-11bH-benzo[a]quinolizine wherein $R_9$ and $R_{10}$ are both lower alkyl.

9. 2-$R_{11}$-3-$R_{12}$-9,10-dimethoxy - 3,4,6,7 - tetrahydro-11bH-benzo[a]quinolizine wherein $R_{11}$ is selected from the group consisting of phenyl, halophenyl, lower alkoxyphenyl and lower alkylphenyl and $R_{12}$ is lower alkyl.

10. 2-phenyl-3-methyl - 9,10 - dimethoxy-3,4,6,7-tetrahydro-11bH-benzo[a]quinolizine.

11. 2-(p-chlorophenyl) - 9,10 - dimethoxy-1,4,6,7-tetrahydro-11bH-benzo[a]quinolizine.

12. 2-(p-chlorophenyl) - 9,10 - dimethoxy-3,4,6,7-tetrahydro-11bH-benzo[a]quinolizine.

References Cited by the Examiner
UNITED STATES PATENTS

| | | | |
|---|---|---|---|
| 2,954,382 | 9/1960 | Osbond | 260—289 |
| 3,132,147 | 5/1964 | Schopf | 260—288 |
| 3,159,638 | 12/1964 | Ritchie et al. | 260—289 XR |
| 3,209,005 | 9/1965 | Brossi et al. | 260—289 XR |

FOREIGN PATENTS 615,474  3/1961  Belgium.

OTHER REFERENCES

Battersby, J. Chem. Soc. (London), 1959, pp. 3512–21.
Elderfield, "Heterocyclic Chemistry," vol. IV, Wiley 1952, pp. 282–6.
Fieser and Fieser, Natural Products Related to Phenanthrene, 3rd Edition, 1949, page 533.
Osbond, J. Chem. Soc. (London), 1961, pp. 4711–18.
Tomimatsu J. Pharm. Soc. Japan 77, pp. 7–10 (1957).
Van Tamelen, J. Am. Chem. Soc. 79, pp. 4817–18 (1957).

ALEX MAZEL, *Primary Examiner.*

NICHOLAS S. RIZZO, HENRY R. JILES, *Examiners.*

DONALD G. DAUS, *Assistant Examiner.*